United States Patent [19]
Nüssli

[11] Patent Number: 4,807,089
[45] Date of Patent: Feb. 21, 1989

[54] REFLECTOR FOR PHOTOGRAPHIC SOURCES OF LIGHT

[75] Inventor: Armin Nüssli, Rodersdorf, Switzerland

[73] Assignee: Bron Elektronik AG, Allschwil, Switzerland

[21] Appl. No.: 157,966

[22] Filed: Feb. 19, 1988

[30] Foreign Application Priority Data

Feb. 21, 1987 [DE] Fed. Rep. of Germany ... 8702694[U]

[51] Int. Cl.⁴ .............................................. G03B 15/02
[52] U.S. Cl. ...................................... 362/17; 362/320; 362/343
[58] Field of Search .................. 362/16, 17, 18, 351, 362/352, 343, 353, 355, 356, 357, 358, 320

[56] References Cited
U.S. PATENT DOCUMENTS

| | | | |
|---|---|---|---|
| 4,594,645 | 6/1986 | Terashita | 362/18 |
| 4,616,293 | 10/1986 | Baliozian | 362/18 X |
| 4,633,374 | 12/1986 | Waltz et al. | 362/18 X |
| 4,757,425 | 7/1988 | Waltz | 362/18 |

*Primary Examiner*—Stephen F. Husar
*Attorney, Agent, or Firm*—Becker & Becker

[57] ABSTRACT

A reflector for photographic sources of light, whereby an umbrella-like frame that includes struts can be placed on a mounting for a light source. A connection element is provided on the ends of the struts. A flexible reflector sheathing is disposed on the frame and has a light-discharge opening remote from the mounting. The light-discharge opening has an edge region therearound. A closure member is provided along the edge region of the light-discharge opening, with this closure member being adapted to cooperate with the connection element to provide a detachable connection of the reflector sheathing to the frame.

8 Claims, 2 Drawing Sheets

REFLECTOR FOR PHOTOGRAPHIC SOURCES OF LIGHT

BACKGROUND OF THE INVENTION

The present invention relates to a reflector for photographic sources of light such as flashlight lamps and incandescent or glow lamps, whereby an umbrella-like frame that includes struts can be placed on a mounting for a light source.

Once heretofore known reflector includes a flexible covering that forms a reflector sheathing and a diffuser screen that covers the light discharge opening of the latter, with the diffuser screen being separate from the continuous reflector sheathing, and with both the diffuser screen and the reflector sheathing being provided with closure elements for detachable interconnection of the diffuser screen and the reflector sheathing to one another. Reflectors of this type are easy to transport because the frame, with its struts, can be taken off and the flexible covering can be removed and collapsed. The reflector can therefore have a very large light discharge opening or diffuser screen with dimensions of 80×80 cm and more without its size being a burden for storage and transport purposes.

With the heretofore known reflector of the aforementioned type, the front edge of the reflector sheathing is provided with a stick-type or Velcro-type fastening band as a closure member. This closure member extends all the way around and can be detachably connected to a stick-type or Velcro-type fastening band that is disposed as a closure member along the adjacent outer edge of the diffuser screen. In this way the reflector sheathing can be easily detached from the diffuser screen and can also be installed on the frame. However, to secure the reflector sheathing to the frame it is necessary to have the diffuser screen with its closure member, because the closure member of the reflector sheathing must be connected to the closure member of the diffuser screen. Consequently, it is not possible to use the reflector without the diffuser screen.

It is therefore an object of the present invention to provide a reflector that can also be utilized without a diffuser screen.

SUMMARY OF THE INVENTION

The reflector of the present invention comprises: a connection element that is provided on the ends of the struts; a flexible reflector sheathing that is disposed on the frame and has a light-discharge opening remote from the mounting, with this light-discharge opening having an edge region therearound; and a first closure member that is provided along the edge region of the light-discharge opening, with this first closure member being adapted to cooperate with the connection element to provide detachable connection of the reflector sheathing to the frame.

The reflector of the present invention can be used without a diffuser screen. To hold the reflector sheathing on the frame it is merely necessary to use the connection element, which is detachably connectable to the closure member of the reflector sheathing. By selectively providing the reflector with a diffuser screen, various light qualities can be produced. If needed, the diffuser screen can be detachably secured to the connection element by its own closure member.

An advantageous connection between the reflector sheathing and/or the diffuser screen on the one hand, and the connection element on the other hand, is achieved via a stick-type or Velcro-type fastening. In this case, the connection element is a stick-type or Velcro-type fastening band that cooperates with the closure members of the reflector sheathing and the diffuser screen, with these closure members also being in the form of stick-type or Velcro-type fastening bands. A fastening of this type is easy to detach and is light tight, so that when a diffuser screen is placed in position, the light yield is not reduced; in other words, the selected light discharge is not adversely affected by the diffuser screen.

The reflector sheathing and the diffuser screen are advantageously completely detachable from the connection element, so that the reflector sheathing and the diffuser screen can each be easily respectively removed and/or installed in position.

The struts of the frame preferably hold the connection element in a tensioned condition. The struts themselves are preferably resilient, and are held in their resiliently deformed position by the band-like connection element that extends all the way around. The reflector sheathing and/or the diffuser screen can then be easily secured to the tensioned connection element by their respective closure member. This assures, in particular, a very simple light tight connection of the reflector sheathing and/or the diffuser screen.

So that the struts can be reliably connected to the connection element, the latter is advantageously provided with receiving pockets into which the ends of the struts are inserted.

The closure members of the reflector sheathing and of the diffuser screen are advantageously detachably connected to different sides of the connection element. In this way, the reflector sheathing and the diffuser screen can each be separately installed or removed without disturbing the connection of the other part to the connection element.

Further specific features of the present invention will be described in detail subsequently.

BRIEF DESCRIPTION OF THE DRAWINGS

This object, and other objects and advantages of the present invention, will appear more clearly from the following specification in conjunction with the accompanying schematic drawings, in which.

DESCRIPTION OF THE PREFERRED EMBODIMENTS

Figure 1:
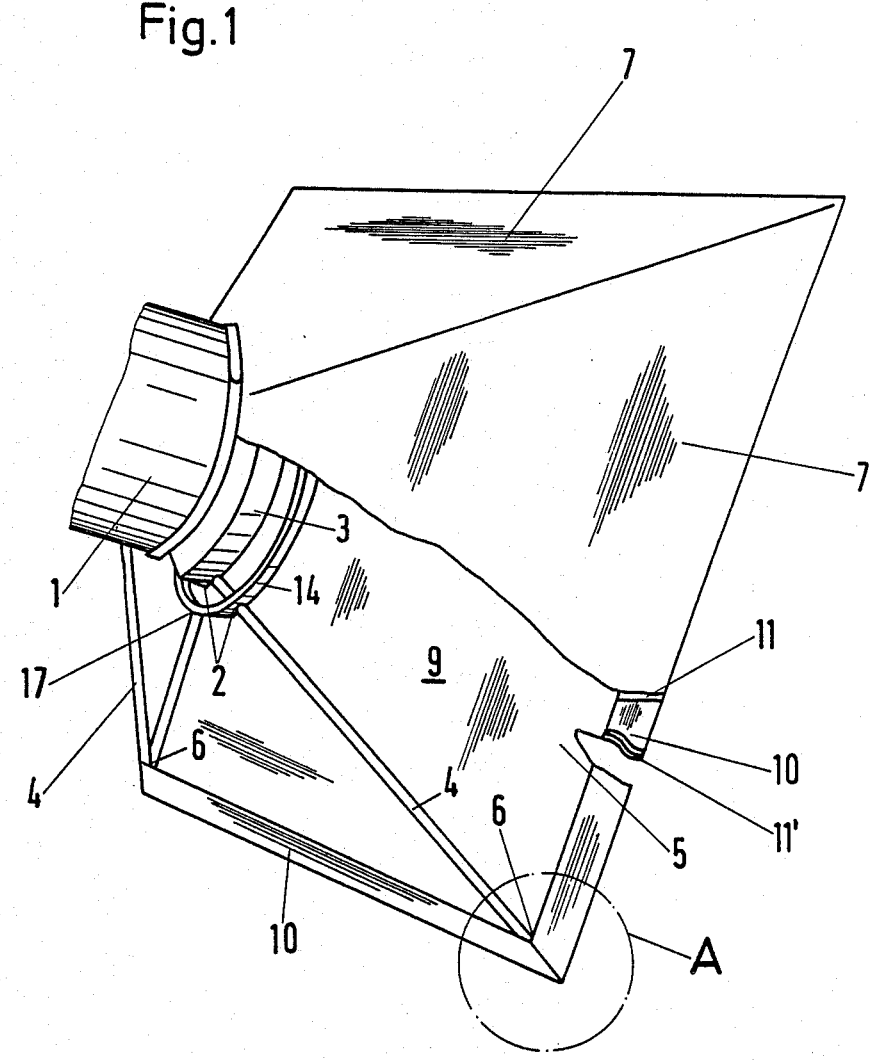
FIG. 1 is a perspective view of one exemplary embodiment of the inventive reflector with part of the reflector sheathing and connection element being omitted.
Figure 2:
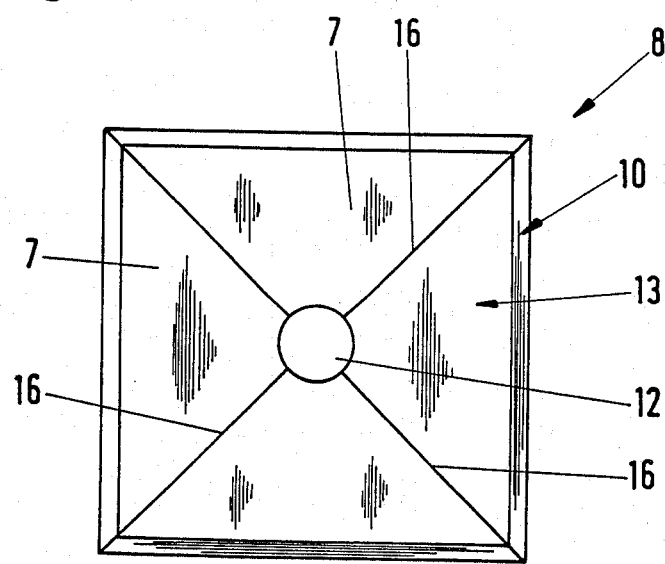
FIG. 2 is an end view of the reflector sheathing without a diffuser screen and with a connection element that extends all the way around.

Referring now to the drawings in detail, the reflector illustrated in FIG. 1 is part of a source of light, for example an incandescent or glow lamp, or a flashlight lamp, that is not illustrated in greater detail. A reflector ring or collar 2 is secured to a mounting or casing 1 of the light source. The reflector ring 3 is provided with holes or openings 2 for receiving struts or supports 4;

four such holes 2 are provided in the illustrated embodiment. The holes 2 are distributed over the periphery 14 of the reflector ring 3. In the illustrated embodiment, the holes 2 are spaced from one another by 90°, so that in each case two holes are disposed diametrically opposite one another. The struts 4 are held in the openings 2 at an angle to the plane that is formed by the reflector ring 3, so that the ends 6 of the struts 4 define a plane that is parallel to and spaced from the plane of the reflector ring 3. The ends 6 of the struts 4 are disposed in receiving pockets 15 (see FIG. 3) of a band-like connection element 10 that extends all the way around and is preferably a stick-type or Velcro-type fastening band; the connection element 10 is held by struts 4.

When the connection element 10 is not installed, the distances between the ends 6 of the struts 4 is greater than the distances between the receiving pockets 15. By resiliently bending the struts 4, the ends 6 thereof can be inserted into the receiving pockets 15. The tensioning of the resilient struts 4 that is obtained in this way tightly holds the connection element 10 in a taut state.

A reflector cover or sheathing 8 is pulled over the resulting pyramidal or paraboloidal structure comprised of the reflector ring 3, the struts 4, and the installed connection element 10. The reflector sheathing 8 is closed or continuous over its surface, and to a large extend surrounds the space 9 between the reflector ring 3 and the connection element 10 in a light proof manner. The reflector sheathing 8 is made of a flexible material, preferably fabric; the inside side surfaces that face one another are provided with a reflective layer or coating.

In the illustrated embodiment, the reflector sheathing 8 is made of four approximately trapezoidal pieces of material that form the side walls 7 of the reflector and are connected at their adjoining edges by seams 16. The double layers of material that result from the seams 16 at the edges are disposed in the interior 9 of the reflector sheathing 8. The seams are disposed in such a way that when the reflector sheathing 8 is installed, these seams are disposed in the vicinity of the struts 4.

The reflector sheathing 8 has two openings 12 and 13 that are disposed at opposite ends from one another. The larger opening 13 forms the light-discharge opening, and also corresponds to the external dimensions of a diffuser screen 5. The smaller opening 12 conforms to the shape of the reflector ring 3, with the dimensions of the opening 12 being smaller than the largest outer diameter of the reflector ring. Secured in the edge region of the larger opening 13 is a closure member 11 that is embodied as a stick-type or Velcro-type fastening band. The closure member 11 is preferably secured all the way around the inner surface of the reflector sheathing 8 without interruption. The closure member 11 is advantageously disposed ins such a way that its outer edge coincides with the front edge of the reflector sheathing 8.

The diffuser screen 5 is flexible and is preferably made of a textile material. Secured all the way around the edge of the diffuser screen 5 is a further band-like closure member 11' that is also in the form of a stick-type or Velcro-type fastening band. The closure member 11' is secured to the inner edge of the diffuser screen 5, and preferably coincides with the outer edge of the diffuser screen. When the diffuser screen 5 is installed, the closure member 11' rests against the front end of the connection element 10 on the one side thereof, while the closure member 11 of the reflector sheathing 8 rests against the other side of the connection element 10 (see FIG. 1). However, it would also be possible for the diffuser screen 5 to have an edge that extends around and overlaps the reflector sheathing 8 from the outside. In this case, the outer surface of the reflector sheathing 8 is provided with a further closure member, preferably a stick-type or Velcrotype fastening band, while the extended-around edge of the diffuser screen 5 is provided with the closure member 11' on its inner surface.

Figure 3:
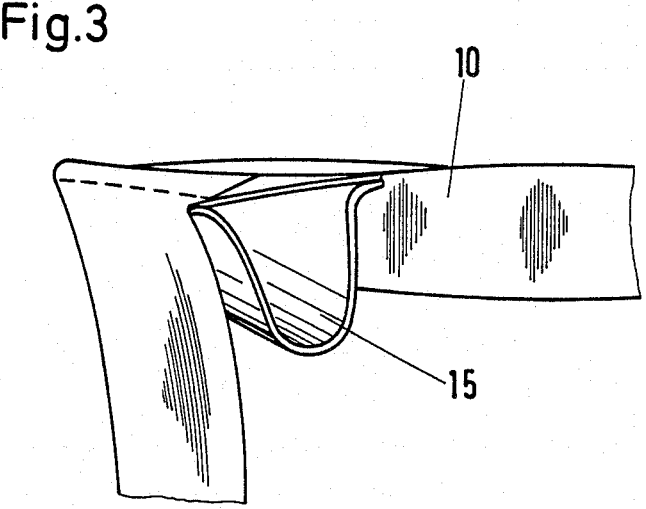
FIG. 3 is an enlarged view of that corner region of the inventive reflector encircled by the dot-dash line A in FIG. 1, but without a reflector sheathing or diffuser screen.

The struts 4 extend into the receiving pockets 15 that are shown in FIG. 3 and that are secured directly to the inner surface of the connection element 10 in the corners thereof. These corners are advantageously reinforced, with this reinforcement, as well as the receiving pockets 15 themselves, expediently being made of leather or of a leather-like material.

When the light source is not assembled, the reflector sheathing 8, with its larger opening 13 in front, is pulled from behind, in other words proceeding from the reflector ring 3, over the frame that is comprised of the reflector ring 3, the struts 4, and the connection element 10. The reflector sheathing 8 is then easily detachably secured to the connection element 10 via the closure member 11, and is, to a large extent, light tight or opaque. Since the two members 10 and 11 are preferably Velcro-type fasteners, the reflector sheathing 8 can be easily secured to, and again detached from, the connection element 10. The opening 12 of the reflector sheathing 8 is designed in such a way that the outer rim 17 of the reflector ring 3 to a large extend rests tightly against the inner surface of the reflector sheathing 8. The configurations of the reflector ring 3 and of the reflector sheathing 8 are advantageously such that nearly the entire axial length of the reflector ring 3 is surrounded by the reflector sheathing 8, with the entire length of the reflector ring 3 preferably resting against the inner surface of the reflector sheathing 8. To achieve a particularly secure seating of the reflector sheathing 8, when the entire reflector is assembled the sheathing is clamped between the reflector ring 3 and the casing 1 of the light source.

As described above, the reflector sheathing 8 can be connected with the diffuser screen 5 in such a way as to be largely light tight. In addition, a more reliable and largely light tight connection of the reflector to the casing 1 of the light source is achieved.

The inventive reflector assures a high light yield or efficiency since no light can escape to the sides. This assures that when photographs are being taken, disruptive stray light is avoided. The discharge of light is limited to the crosssectional light discharge area determined by the diffuser screen 5. Thus, a precise lighting or illumination of the objects that are to be photographed is assured.

Mounting of the reflector is considerably simplified due to the closed construction of the reflector sheathing 8 because the latter can be placed upon the struts 4, which are already tensioned by the connection element 10, in a single operation, it then merely being necessary to detachably connect the reflector sheathing 8 via its closure member 11 to the connection element 10. Since the reflector sheathing 8 and the diffuser screen 5 can be secured to the connection element 10 independently of one another, the reflector can selectively be provided with the reflector sheathing 8 with or without the diffuser screen 5. Thus, by providing or omitting the diffuser screen 5, it is possible to produce different qualities of light. The diffuser screen 5 can be easily installed and removed via the elements 11' and 10. Since the diffuser screen 5 is a separate part from the reflector sheathing 8, it is also possible to secure a number of diffuser screens 5 to the reflector one on top of the other, so that the degree of diffusion can also be controlled. In this case, each of the diffuser screens 5 is provided with one of the previously described closure members, which again are preferably in the form of Velcro-type fasteners.

Since the described connection between the connection element 10 on the one hand and the reflector sheathing 8 or the diffuser screen 5 on the other hand are easily detachable, it is very easy to replace or exchange the diffuser screen 5. For this purpose, it is not necessary to remove the reflector sheathing 8 from the struts 4, so that the reflector can remain on the casing 1.

As previously mentioned, the elements 10, 11, and 11' are preferably stick-type or Velcro-type fastening bands that make it possible to easily mount and remove the reflector sheathing 8 and the diffuser screen 5. However, in place of such Velcro-type fasteners, these elements could also be parts of a slide fastener, a zipper closure, a snap closure, etc.

The present invention is, of course, in no way restricted to the specific disclosure of the specification and drawings, but also encompasses any modifications within the scope of the appended claims.

What I claim is:

1. A reflector for photograghic sources of light, whereby an umbrella-like frame that includes struts can be placed on a mounting for a light source, with each of said struts having an end remote from said mounting; said reflector further comprising:
    a connection element provided on said ends of said struts;
    a flexible reflector sheathing that is disposed on said frame and has a light-discharge opening remote from said mounting, with said reflector sheathing having an edge region around said light-discharge opening; and
    a first closure member provided along said edge region of said reflector sheathing, with said first closure member being adapted to cooperate with said connection element in such a way as to provide a detachable connection of said reflector sheathing to said connection element and hence to said frame.

2. A reflector according to claim 1, which includes a separate diffuser screen that has edge regions on which are provided a second closure member that is adapted to cooperate with said connection element in such a way as to provide a detachable connection of said diffuser screen to said connection element to cover said light-discharge opening of said reflector sheathing.

3. A reflector according to claim 2, in which said connection element is a band-like fastening element.

4. A reflector according to claim 3, in which said connection element is a Velcro-type fastening band.

5. A reflector according to claim 2, in which said reflector sheathing and said diffuser screen can be completely separated from said connection element.

6. A reflector according to claim 2, in which said struts are resilient and hold said connection element in a tensioned state.

7. A reflector according to claim 2, in which said connection element is provided with receiving pockets for receiving the ends of said struts therein.

8. A reflector according to claim 2, in which said first closure member of said reflector sheathing and said second closure member of said diffuser screen are detachably connectable to opposite sides of said connection element.

* * * * *